Patented Nov. 7, 1950

2,529,318

UNITED STATES PATENT OFFICE 2,529,318

LOW-TEMPERATURE POLYMERIZATION AT THE FREEZING POINT OF THE POLYMERIZATE MATERIAL

Bruce R. Tegge, Roselle, N. J., assignor to Standard Oil Development Company, a corporation of Delaware No Drawing. Application October 8, 1946, Serial No. 702,079

9 Claims. (Cl. 260—85.3)

This invention relates to the low temperature polymerization of olefins by Friedel-Crafts catalysts; relates particularly to continuous polymerization processes, and relates especially to processes in which the continuous polymerization reaction is conducted at a temperature at or very close to the freezing point of the reactor contents in order to reduce the deposition of polymer on the reactor walls.

It has been found possible to copolymerize mixtures of isobutylene and a multi olefin, such as isoprene (or other ethylenic unsaturates), at temperatures ranging from $-40$ to $-164°$ C. by the application thereto of Friedel-Crafts catalysts such as aluminum chloride in solution in low-freezing, non-complex forming solvents such as methyl chloride to yield a solid copolymer having many of the physical properties of rubber, to produce a highly valuable structural material. The preferred commercial method for manufacturing this material is by a continuous process in which steady streams of cold olefinic material and diluent; and a catalyst solution are delivered to a reactor in which they are polymerized and allowed to overflow in the form of a slurry which is discharged into warm water to volatilize out unpolymerized reactants, diluents and catalyst solvent; hydrolyze residual catalyst, and convert the material into a water slurry from which the polymer is strained out, dried and processed for its ultimate use.

In this reaction, however, great difficulty is encountered with a "fouling" of the reactor caused by a strong tendency for the polymer to precipitate onto and adhere to the walls of the reactor, the stirrer and other structural features from which it is extremely hard to dislodge, resulting in relatively short runs and a difficult problem of cleaning and removal. In this commercial development, commercial ethylene in a refrigerating jacket has been used as the refrigerant, the average purity of which has been about 95% ethylene, with the remainder such materials as ethane, propane, and traces of still higher boiling materials; this refrigerant showing a boiling point under plant conditions of 0 to 3 or 4 pounds back pressure at the compressors of temperatures between about $-100°$ C. and $-95°$ C. The unavoidable temperature gradient between the reactor contents and the refrigerant then resulted in a temperature of the polymerizate mixture in the reactor usually between $-95°$ C. and $-90°$ C., with the result that the reactor contents remained above the freezing point at all times.

It is now found that if the polymerization reaction is conducted at or as near to the freezing point of the reactor contents as possible, that is within a degree or less, so as to tend to produce on the inner surface of the reactor a thin layer of frozen material, the tendency towards fouling of the reactor is very greatly reduced, the cleaning problems much simplified and a superior polymer produced.

Thus the process of the invention continuously copolymerizes ethylenically unsaturated material which may be simply monoolefinic hydrocarbons; may be mixed monoolefinic hydrocarbons; or may consist of or contain ethylenic unsaturated which have oxygen, halogens, and similar substances in or on the linear chain in the presence of a diluent by the application thereto of a continuing stream of catalyst solution at a temperature at or close to the freezing point of the material to avoid the formation of polymer adherent to the reactor members. Other objects and details of the invention will be apparent from the following description:

The raw materials for this polymerization reaction consist of a major proportion of isobutylene with a minor proportion of a conjugated diolefin of 4 to 6 carbon atoms such as butadiene or isoprene or piperylene or dimethyl butadiene or other multiolefin or ethylenic multiunsaturate such as dimethallyl or myrcene, or the like; any of the organic compounds containing more than one carbon to carbon double linkage and from 4 to 14 inclusive carbon atoms per molecule being more or less usable, without regard to the presence of substituents in or on the carbon atom chain. For the purposes of this specification a ethylenic multiunsaturate is defined as any substance containing two or more carbon to carbon double linkages per molecule without regard to the presence or absence of substituents of any character either in or on the carbon atom chain; and without regard to any distinction between linear chain compounds and ring compounds in the substituents; and without regard to the presence or absence of such substituents as chlorine, oxygen and similar substances. This material is mixed and diluted with a diluent such as an alkyl halide, especially ethyl or methyl chloride or other mono or poly halo-substituted aliphatic; or carbon disulfide or one or more of the hydrocarbons or other inert diluent and brought to a temperature within the range between about $-40°$ C. and $-164°$ C., depending upon the freezing point of the material in the reaction mixture. For the purposes of this specification a halo-substituted alkyl is defined as any saturated linear chain carbon compound having one or more halogen substituents without regard to the number or position of the halogen substituent. When the mixture contains from 1 to 3 or 4 volumes of methyl chloride per volume of isobutylene, the mixed freezing point is found to lie somewhat below —100° C., such that with ordinary commercial ethylene as refrigerant, the unavoidable thermal gradient through the reactor walls results in a polymerization temperature which is always above the mixed freezing point.

The preferred polymerization mixture is from 95 parts to 99 parts of isobutylene with from 5 parts to one part of isoprene, although with other of the multiolefins, the requirement usually merely is that the major component be the isobutylene. This mixture may be used alone, in which case the freezing temperature is very close to that of pure isobutylene at —146.8° C. Usually, however, from ½ volume to 4 or 5 volumes of a diluent are used, which, for the present commercial process, usually is methyl chloride. Alternatively, a wide range of other diluents may be used, including such substances as ethyl chloride, carbon disulfide, various of the low-boiling hydrocarbons, various of the fluorine-substituted aliphatics, both mono- and poly-substituted, and various of the mixed halogens; the requirement merely being that the freezing point of the diluent be reasonably near to the desired polymerization temperature.

Simultaneously, a catalyst is prepared consisting of a Friedel-Crafts catalyst in solution in a low-freezing, non-complex-forming solvent. The preferred catalyst substance is aluminum chloride, but any of the Friedel-Crafts catalysts disclosed by N. O. Calloway in his article on "The Friedel-Crafts Synthesis" printed in the issue of "Chemical Reviews" published for the American Chemical Society at Baltimore in 1935, in Volume XVII, No. 3, the article beginning on page 327, the list being particularly well shown on page 375, may be used. Also various double salt Friedel-Crafts catalysts may be used such as aluminum chloro bromide or aluminum chloro alk oxide, or the like, depending upon the solvent used.

The preferred catalyst solvent is an alkyl halide such as methyl chloride, but many other solvents are useful including such substances as carbon disulfide or various mono or poly halogenated aliphatics, or hydrocarbons themselves, depending upon the particular catalyst used; the requirement being that the solvent be "low-freezing and non-complex-forming" with the Friedel-Crafts catalyst substance. To be low-freezing, it is merely necessary that the solvent have a freezing point below 0° C.; and to be non-complex-forming, it is merely necessary that there shall not separate from the catalyst solution, upon evaporation from the solvent, a compound between the solvent and the Friedel-Crafts catalyst; or alternatively, that the addition of the solvent in the form of vapor to the catalyst at constant temperature will lead to a substantially continuous change in the composition of the catalyst solution phase and to a continuous increase in the partial pressure of the solvent. The catalyst solution may contain from 0.1% to 7% to 10% to 15% of catalyst substance, depending upon the degree of solubility and the catalyst potency.

The polymerization reaction is preferably conducted in a continuous reactor such as is disclosed in abandoned application Serial No. 448,575, filed June 26, 1942, by John H. Bannon or Serial No. 545,099, filed July 15, 1944, by Joseph Nelson, the subject matter of which cross-references is herewith incorporated into and made a part of the present disclosure.

For this procedure, the reactor is equipped with a refrigerating jacket, which preferably contains liquid ethylene as a low-boiling liquid refrigerant. In order then to bring the temperature to the freezing point of the reactor mixture, two procedures are possible which may be used separately or together. One of these alternatives consists in the application to the refregerating jacket of a relatively strong suction, to bring the boiling point of the liquid refrigerant down to the desired temperature, which must be sufficiently low, in spite of the presence of any impurities in the refrigerant liquid, so that the thermal gradient through the reactor walls does not bring the inner wall temperature above the freezing point of at least one of the components in the reaction mixture. The other procedure is to add to the reaction mixture a higher freezing material such that the mixed freezing point is at a temperature which is conveniently obtainable by the available refrigerant.

Suitable materials suitable for reaction diluents in this procedure which have freezing points satisfactory for use as diluents in the mixture are: ethylene dichloride, having a freezing point at —35.3° C., the mixed freezing point being substantially lower; carbon tetrachloride, having a freezing point at —22.8° C., and a mixed freezing point also substantially lower; and carbon dioxide, which may be adjusted in freezing point between about —56° C. and —78° C. by adjustment of the pressure in the reactor. Various mixtures of the above-indicated materials may be used to adjust the freezing point to the precise value desired, the appropriate value usually being determined by the particular refrigerant which is available, by the purity of the refrigerant and by the thermal gradient through the reactor walls. Various of the aliphatic mono- and polyfluorides are useful and various of the mono- and poly-chlorofluorides are useful, since by selection of the proper aliphatic radical and adjustment of the number, character and position of the halogen substituents, the freezing temperature can be adjusted to a desired one of a considerable range of values.

It may be noted that an increase in run length is attainable whether or not an actual layer of material is frozen out on the walls, but much superior results are obtained if a layer of frozen material is present for at least a portion of the total run length, that is, the frozen layer may be formed and melted, then after a variable time interval reformed and remelted; this procedure being possible a considerable number of times. The preferred procedure, however, maintains a more or less thick frozen layer on the inner reactor surface substantially the entire run length since such procedure results in the longest run time. It may be further noted that while the freezing point of the mixture is usually set by the mixed freezing point of the various components present, in most instances the frozen layer is composed very largely, or exclusively, of the highest freezing substance, usually the diluent, especially if the diluent is ethyl or methyl chloride, and while the layer may contain small amounts of other than the highest freezing component, it is only when there are two components present having freezing points very close together that substantial proportions of two components are present in the solid layer.

Thus the invention continuously polymerizes the cold olefinic mixture at or very near to the freezing point temperature of the polymerizate mixture to yield a high-grade copolymer having a Staudinger molecular weight number within the range between about 25,000 and 100,000, preferably within the range between about 35,000 and 60,000 since materials having molecular weights below about 35,000 show an undesirable decrease in tensile strength upon curing and materials having a molecular weight above about 60,000 are so tough and leathery as to be difficult to process and compound. The iodine number of the material usually lies between about 1 and 10, although in some instances it may lie as high as 50. This material is readily compounded with such substances as stearic acid, zinc oxide, carbon black, sulfur and an accelerator such as Tuads or a curing agent such as para quinone dioxime and its esters, analogs and homologs or a dinitroso organic compound, to yield a cured material showing a tensile strength ranging from 1800 pounds to 3600 pounds per square inch with an elongation at break, depending upon the type of cure and the amount of compounded pigment, ranging from 500% to 1200%.

*Example 1.*—A reactor as shown in the copending application Serial No. 545,099, filed July 15, 1944, by Joseph Nelson, was fed continuously with a mixture consisting of approximately 244 parts by weight of isobutylene of a purity of 98% with 6 parts of isoprene of a purity of 96% together with approximately 700 parts of methyl chloride. Simultaneously, liquid ethylene was supplied to the refrigerating jacket of the reactor and allowed to boil at a pressure in the refrigerating jacket of approximately 8.5 pounds per square inch absolute. This pressure maintained the boiling point of the liquid ethylene at a temperature of approximately −171° F. (−113° C.). Simultaneously, a catalyst solution containing 0.1 parts aluminum chloride per 50 parts of methyl chloride was fed to the reactor per 250 parts of isobutylene-isoprene feed and per 700 parts of methyl chloride diluent. In due course equilibrium conditions were obtained for the polymerization reaction at 190 parts of polymer per 1,000 parts of total reactor feed with a continual slurry overflow into a tank of warm water from which the diluent and unpolymerized reactants were volatilized out to leave a residual slurry of polymer in water. At the equilibrium conditions the residual reactor liquid (lacking the polymer content) contained 92.6 wt. per cent methyl chloride and had a freezing point of −152° F. (−102° C.), which is the freezing point of the residual reactor liquid after a 76% conversion of a 25 wt. per cent hydrocarbon feed. Pure methyl chloride freezes at −144° F. (−98° C.).

This procedure with a pressure on the refrigerating jacket of about 8.5 pounds absolute was continued until a run of 161 hours in length had been obtained. The run progressed very smoothly with the temperature difference between the freezing point of the reactor liquid and the refrigerant temperature remaining nearly constant at 18° F. (10° C.) throughout the entire run. This run length is a very great improvement over the normal run length obtained at a polymer production rate of 1.3 lbs./hr./sq. ft. of reactor cooling surface liquid ethylene under a pressure of 14 to 16 pounds absolute; under which conditions, run lengths of from 33 to 60 hours are the rule with few run lengths in excess of about 80 hours.

This run was terminated at the end of the 161 hours mainly because of mass polymer fouling upon the propeller stirrer and upon the uncooled reactor head. These members, however, picked up the adherent fouling coating of polymer much more slowly than in previous runs, even though no frozen layer of polymerization mixture formed on them.

The reason for the very great increase in run length obtained by this procedure before reactor fouling interfered with the reactor agitation is still uncertain. It is possible to remove the reactor head while maintaining the suction upon the refrigerant jacket and find an actual layer of frozen methyl chloride from the polymerizate mixture on the inner surface of the reactor, but no such layer is produced on the propeller stirrer; and cannot be since the stirrer takes merely a temperature close to the fluid temperature; and the reactor head having no refrigerating jacket, likewise is not cold enough to freeze out a layer of polymerizate. Nevertheless, mass polymer deposition occurred much more slowly on these members, in spite of the lack of direct cooling, than in the case of the ordinary type of reaction.

In the operation of the reactor as above outlined, the rate of reaction and accordingly both the rate of heat evolution and the temperature of the reaction mixture vary from time to time for various reasons; possibly because of minor variations in catalyst concentration and purity and minor variations in reactant purity. In any event, the behavior of the reactor seems to indicate the formation of a layer of frozen reactant mixture (methyl chloride), on the inner reactor wall, to which some of the polymer film adheres; then when the reaction rate increases, a portion, or perhaps all of the frozen out layer is melted by the higher reactant temperature, leaving the polymer film unsupported and permitting the rapidly circulating reactor mixture to tear it away, break it up into fragments, and discharge it with the normal polymer slurry. Then when the reaction slows down somewhat, the frozen layer of reactant mixture may re-form and again prevent adherence of the polymer to the reactor surface. During such a cycle, if the frozen layer is completely removed small amounts of polymer film may deposit directly upon the reactor walls and such deposits would not be removable. Repetitions of this cycle of thawing and freezing would eventually permit of the accumulation of a fouling layer sufficient to terminate a run. However, usually a run is terminated by fouling of the propeller stirrer or the reactor head before polymer film deposition on the heat transfer surfaces of the reactor becomes either serious or troublesome.

Thus this procedure shifts the dependence of the run for length, from polymer film formation on the inner surfaces of the reactor to dependence upon the rate of mass polymer fouling of the propeller stirrer and the reactor head. But even these effects are much less pronounced in this method of reaction than is the case in the ordinary reaction, and the rate of accumulation of adherent polymer is much slower than in the conventional type of reaction. These facts strongly suggest that the gain in run length is dependent upon a combination of factors one of which is the formation of a layer of frozen out reactant mixture such as a solid phase of methyl chloride upon the inner surface, at least a portion of which is melted at intervals by temporary increases in reaction rate to free the adhering polymer film and permit removal of such polymer. The second factor in the run length appears to be due to a greater polymer slurry stability at temperatures close to the freezing point and apparently the tendency to precipitate adherent polymer upon the metal surfaces decreases with decreases in temperature, particularly in the temperature range immediately above the freezing point of the reactant mixture.

In any event it is preferable that the temperature of the refrigerant in the refrigerating jacket be sufficiently low to carry through the temperature gradient through the reactor walls to yield a temperature at the inner surface at or near the freezing temperature of the reactant mixture, preferably sufficient to cause the formation, during at least part of a run, on the inner surface of a layer frozen out from the reactant mixture. In view of the impracticability of observing these reactions during an actual run, the above outlined theories cannot be verified and they are offered merely as a theory of operation and not as a necessary portion of the invention. However, regardless of theories of operation, the procedure above outlined results in maintenance of lower reactor temperatures and a cleaner reactor over a longer period of operation and generally much improved reactor performance. Inspection of the reactor at the end of the 161 hours of operation in the example disclosed no polymer film deposition on the reactor heat transfer surfaces.

*Example 2.*—A reactor, as shown in the copending application Serial No. 540,099, filed July 15, 1944, by Joseph Nelson, was fed continuously with a mixture consisting of approximately 244 parts by weight of isobutylene of a purity of 98% and 6 parts of isoprene of a purity of 96% together with approximately 250 parts of carbon dioxide and 440 parts of methyl chloride. Simultaneously, liquid ethylene was supplied to the refrigerating jacket of the reactor and allowed to boil at a pressure in the refrigerating jacket of approximately 17 lbs./sq. in. absolute, corresponding to a refrigerant temperature of about —148° F. (—100° C.). Simultaneously, catalyst containing 0.5 part of aluminum chloride per 60 parts of methyl chloride was fed to the reactor per 250 parts of isobutylene-isoprene feed and per 690 parts of combined carbon dioxide-methyl chloride diluent. In due course equilibrium conditions were established for the polymerization reaction of 150 parts of polymer per 1,000 parts of total reactor feed and catalyst solution. This mixture overflowed continuously from the reactor to an agitated tank of water at 150° F. from which the liquid methyl chloride, carbon dioxide and unpolymerized isobutylene and isoprene were volatilized out to leave a residual slurry of polymer in water. At the equilibrium conditions the residual reactor liquid (not including the solid precipitated polymer) contained about 12 wt. per cent of unreacted hydrocarbon, 29 wt. per cent carbon dioxide, and 59 wt. per cent of methyl chloride and had an initial freezing point of —128° F. (—89° C.).

The run progressed smoothly with the temperature difference between the reactor liquid and the refrigerant remaining nearly constant at 20° F. (11° C.) throughout the run, although slight adjustments in the carbon dioxide feed rate were made to compensate for the variations in the hydrocarbon conversion level which changed the composition of the reactor liquid slightly and affected the freezing point of the reactor liquid correspondingly. Examination of the reactor at the end of the run revealed no polymer film formation on the reactor heat transfer surfaces.

*Example 3.*—A considerable number of polymerization runs were made in which operation at varying, sharply reduced temperatures were conducted. In some of these runs, the jacket temperature was amply low to establish good layers of frozen out polymerizate mixture material; and in some of them removal of the reactor head permitted actual observation of the frozen out layers. In others, the temperature was somewhat higher and frozen methyl chloride layers may have been present during only part of the run length. The relationship between temperature and run length and the characteristic details of the run are well shown in the following table:

| Run Number | A | B | C | D |
| --- | --- | --- | --- | --- |
| Run Length, Hrs | 33 | 60 | 137 | 161 |
| Refrigerant Temp., °F | —135 | —147 | —158 | —171 |
| Min. Reactor Slurry Temp., °F | —124 | —138 | —151 | —155 |
| Max. Reactor Slurry Temp., °F | —115 | —127 | —131 | —150 |
| Polymer Production Rate | 1.3 #/Hr./Sq. Ft. | | | |

In this table four polymerization runs in the continuous reactor are shown; these runs being conducted by the addition of catalyst at such a rate as to produce approximately 1.3 pounds of polymer per hour per square foot of heat transfer surface in the reactor walls. In the table the refrigerant temperature in the jacket is shown in degrees Fahrenheit, as obtained by the application of a pressure below atmospheric pressure; i. e., suction by the compressor upon the refrigerating jacket. The minimum reactor slurry temperature during the run, usually near the beginning, is shown for each run and the maximum reactor slurry temperature for each run, usually near the end of the run, is likewise shown. It will be noted from these results that the reactor run length increases with lowering of temperature and there is shown in detail the character of improvement in run length obtainable by minor reduction in jacket temperature.

Thus the invention polymerizes an olefinic mixture at or near to the freezing point of the polymerizate mixture to produce a high-grade polymer under conditions where minimum film formation and adhesiveness of the polymer on the reactor walls is encountered, thereby permitting of a greatly increased length of time of continuous operation before the rate of heat transfer through the reactor walls becomes prohibitively slow.

While there are above disclosed but a limited number of embodiments of the process of the invention, it is possible to produce still other embodiments without departing from the inventive concept herein disclosed, and it is therefore desired that only such limitations be imposed on the appended claims as are stated therein or required by the prior art.

The invention claimed is:

1. In a low temperature polymerization reaction for the polymerization of olefinic material at temperatures within the range between —40° and —164° C., by the application thereto of a Friedel-Crafts active metal halide catalyst, the steps in combination of cooling the olefinic material by the application thereto of external refrigeration at such a temperature in relation to the freezing point of the reactant mixture as to freeze out a layer of material from the reactant adjacent to the refrigerant.

2. In a low temperature polymerization reaction for the polymerization of olefinic material at temperatures within the range between —40° and —164° C., the steps in combination of adding to the olefinic material a non-polymerizable diluent, cooling the material by external refrigeration at such a temperature that the temperature gradient between the external refrigerant and the olefinic material is sufficiently low to freeze out from the olefinic-diluent material a layer of solid olefinic-diluent material between the body of polymerizate mixture and the surrounding refrigerant.

3. In a low temperature polymerization reaction for the polymerization of olefinic material at temperatures within the range between —40° and —164° C., the steps in combination of adding to the olefinic material a non-polymerizable diluent, cooling the material by external refrigeration at such a temperature that the temperature gradient between the external refrigerant and the olefinic material is sufficiently low to freeze out from the olefinic-diluent material a layer of solid olefinic-diluent material between the body of polymerizate mixture and the surrounding refrigerant, for at least a major portion of the polymerization cycle.

4. In a low temperature polymerization reaction, the steps in combination of mixing together isobutylene and a multiolefin having from 4 to 14, inclusive, carbon atoms per molecule, cooling the resulting liquid feed mixture to a temperature within the range between —40° C. and —164° C., by the application thereto of refrigeration from a refrigerating jacket, polymerizing the mixture by the application thereto of a Friedel-Crafts active metal halide catalyst, and adjusting the temperature of the refrigerant to such a value as to freeze out on the wall of the jacket a solid layer of frozen feed liquid from the reaction mixture prior to and during the time of application of catalyst to the cold mixture.

5. In a low temperature polymerization reaction, the steps in combination of mixing together a major proportion of isobutylene and a minor proportion of conjugated diolefin of 4 to 6 carbon atoms together with a non-polymerizable diluent having a freezing point sufficiently near to the polymerization temperature to permit the freezing out of a layer containing diluent, cooling the resulting liquid feed mixture to a temperature within the range between —40° C. and —164° C., by the application thereto of refrigeration from a refrigerating jacket, polymerizing the mixture by the application thereto of a Friedel-Crafts active metal halide catalyst in solution in a low freezing, non-complex forming solvent, and adjusting the temperature of the refrigerant to such a value as to freeze out on the wall of the jacket a solid layer of frozen feed liquid from the reaction mixture prior to and during the time of application of catalyst to the cold mixture.

6. In a low temperature polymerization reaction, the steps in combination of mixing together a major proportion of isobutylene and a minor proportion of isoprene together with a non-polymerizable diluent having a freezing point sufficiently near to the polymerization temperature to permit the freezing out of a layer containing diluent, cooling the resulting liquid feed mixture to a temperature within the range between —40° C. and —164° C., by the application thereto of refrigeration from a refrigerating jacket, polymerizing the mixture by the application thereto of aluminum chloride catalyst, and adjusting the temperature of the refrigerant to such a value as to freeze out on the wall of the jacket a solid layer of frozen feed liquid from the reaction mixture prior to and during the time of application of catalyst to the cold mixture.

7. In a low temperature polymerization reaction, the steps in combination of mixing together isobutylene and butadiene, cooling the resulting liquid feed mixture to a temperature within the range between —40° C. and —164° C., by the application thereto of refrigeration from a refrigerating jacket, polymerizing the mixture by the application thereto of a Friedel-Crafts active metal halide catalyst, and adjusting the temperature of the refrigerant to such a value as to freeze out on the wall of the jacket a solid layer of frozen feed liquid from the reaction mixture prior to and during the time of application of catalyst to the cold mixture.

8. In a low temperature polymerization reaction, the steps in combination of mixing together a major proportion of isobutylene and a minor proportion of butadiene together with a non-polymerizable alkyl halide diluent having a freezing point sufficiently near to the polymerization temperature to permit the freezing out of a layer containing diluent, cooling the resulting liquid feed mixture to a temperature within the range between —40° C. and —164° C., by the application thereto of refrigeration from a refrigerating jacket, polymerizing the mixture by the application thereto of a Friedel-Crafts active metal halide catalyst, and adjusting the temperature of the refrigerant to such a value as to freeze out on the wall of the jacket a solid layer of frozen feed liquid from the reaction mixture prior to and during the time of application of catalyst to the cold mixture.

9. In a low temperature polymerization reaction, the steps in combination of mixing together a major proportion of isobutylene and a minor proportion of isoprene together with methyl chloride diluent, cooling the resulting liquid feed mixture to a temperature within the range between —40° C. and —164° C., by the application thereto of refrigeration from a refrigerating jacket, polymerizing the mixture by the application thereto of a catalyst solution of aluminum chloride dissolved in methyl chloride, and adjusting the temperature of the refrigerant to such a value as to freeze out on the wall of the jacket a solid layer of frozen feed liquid from the reaction mixture prior to and during the time of application of catalyst to the cold mixture.

BRUCE R. TEGGE.

REFERENCES CITED

The following references are of record in the file of this patent:

UNITED STATES PATENTS

| Number | Name | Date |
| --- | --- | --- |
| 2,389,693 | Sparks et al. | Nov. 27, 1945 |

FOREIGN PATENTS

| Number | Country | Date |
| --- | --- | --- |
| 541,076 | Great Britain | Nov. 12, 1941 |